(Model.)
N. N. & F. J. FAIRCHILD.
MACHINE FOR REDUCING THE HEIGHT OF CHEESE BOXES.
No. 262,387. Patented Aug. 8, 1882.
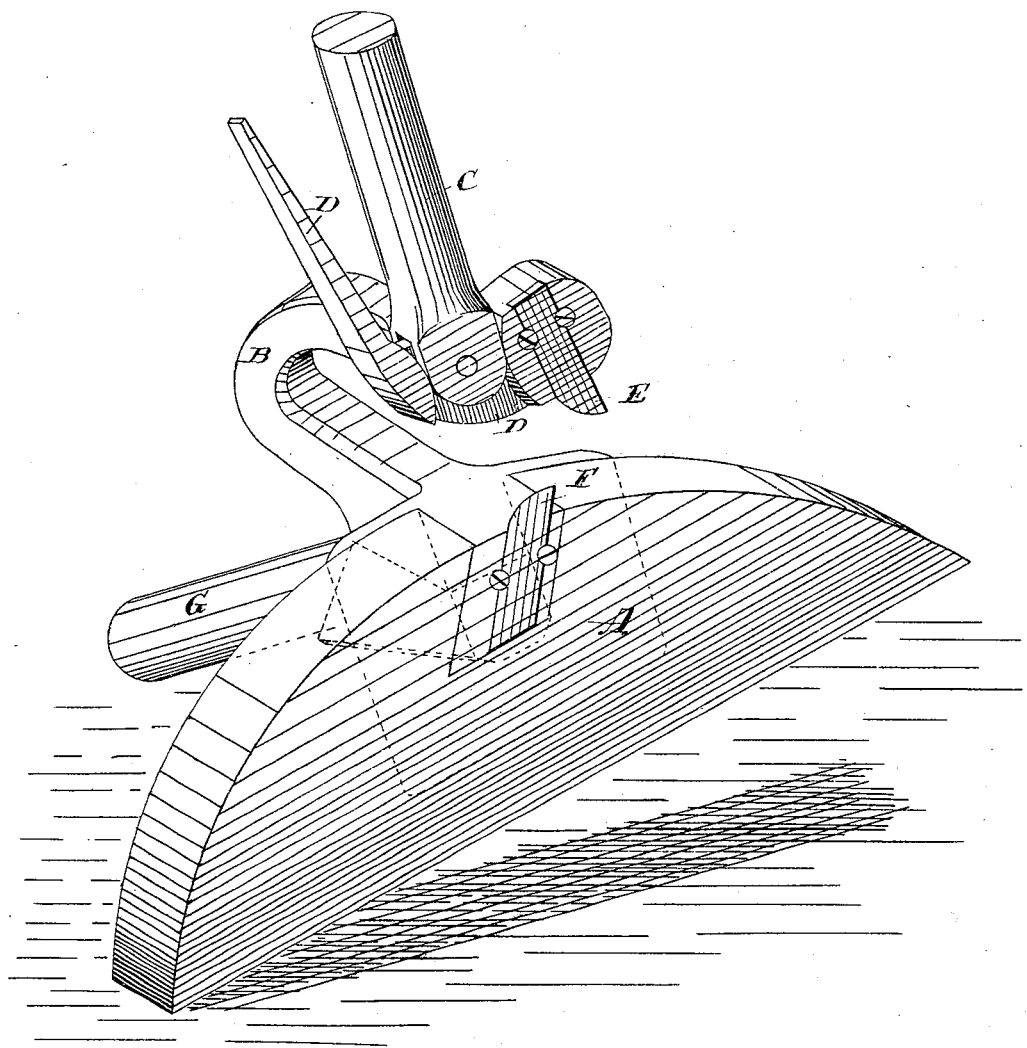
WITNESSES:
INVENTOR:
N. N. Fairchild
F. J. Fairchild
BY
ATTORNEYS.

UNITED STATES PATENT OFFICE.

NEWELL N. FAIRCHILD AND FRANK J. FAIRCHILD, OF TRENTON, MICH.

MACHINE FOR REDUCING THE HEIGHT OF CHEESE-BOXES.

SPECIFICATION forming part of Letters Patent No. 262,387, dated August 8, 1882.

Application filed April 18, 1882. (Model.)

*To all whom it may concern:*

Be it known that we, NEWELL N. FAIRCHILD and FRANK J. FAIRCHILD, of Trenton, in the county of Wayne and State of Michigan, have invented a new and Improved Device for Cutting the Edges of Cheese-Boxes, of which the following is a full, clear, and exact description.

The object of our invention is to provide a new and improved device for cutting the upper edges of cheese-boxes flush with the top of the cheese after the same has been placed in the box, so that the cover can rest flat on the cheese.

The invention consists in a gage-board provided with a projecting knife and with a bent arm to which a lever is pivoted, to the end of which a knife is attached. The board is placed on the cheese when the same is in the box, and the lever is pressed against the handle at the end of the bent arm, whereby the two knives will be forced through the hoop or side of the box, and the edge will be cut off flush with the top of the cheese when the knives are drawn around along the upper edge of the box.

Reference is to be had to the accompanying drawing, in which a perspective view of our improved device for cutting the edges of cheese-boxes is shown.

A board, A, has one edge rounded about the same as the side of the cheese-box, and to the middle of this rounded edge of the board a U-shaped arm, B, is attached, which projects upward from the board, and is provided at its free end with a handle, C, projecting in the direction from the rounded edge of the board. A curved lever, D, is pivoted in the free end of the arm B, at the inner end of the handle C, and to the inner end of this lever D a knife or cutter, E, is attached, which projects toward the rounded edge of the board, the lower surface of this cutter or knife E being flush with the bottom of the board A. A knife or cutter, F, is attached to the under side of the board A in such a manner that it projects from the rounded edge of the board, the lower surface of the knife F being flush with the under surface of the board A. Both knives E and F can easily be removed or detached in case they are to be sharpened. A handle, G, projects from the upper surface of the board A.

The device is used in the following manner: The cheese having been placed in the box, the board A is placed on the top of the cheese and the lever D is pressed toward the handle C, whereby the edges or points of the knives E and F will be forced into or through the hoop or side of the circular cheese-box, one knife being slightly in advance of the other. The handle C and the lever D are grasped with the right hand and the handle G in the left hand, and the implement is drawn around along the upper edge of the box and cuts off that part of the hoop or side of the box that projects above the cheese. The board A forms a gage and prevents the knives from cutting too deep into the cheese-box or from cutting into the cheese. The knives cut the hoop or sides of the box sharp and clean.

If desired, only one of the knives may be used; but we prefer to provide two knives, as shown, which cut through the hoop or side of the box from opposite sides and independent of each other.

Having thus fully described our invention, we claim as new and desire to secure by Letters Patent—

1. In a device for cutting the edges of cheese-boxes, the combination, with the circular segmental gage-board A, of the blade F, secured rigidly to its lower face, the handle G, and bent arm B, secured to its upper face, and the radial handle C, as shown and described.

2. The combination, with the gage-board A, the fixed blade F, the handles G and C, and the bent arm B, of the hand-lever D, pivoted to the end of arm B and provided with a fixed cutter, E, as shown and described.

NEWELL N. FAIRCHILD.
F. J. FAIRCHILD.

Witnesses:
JAMES CHASE,
ROBERT B. BURRELL.